United States Patent
Bertz et al.

(10) Patent No.: US 8,244,898 B1
(45) Date of Patent: Aug. 14, 2012

(54) SINGLE MESSAGE MEDIA SESSION CONTROL

(75) Inventors: Lyle T. Bertz, Lee's Summit, MO (US); Badri Prasad Subramanyan, Overland Park, KS (US); Woojae Lee, Manhattan, KS (US); Sanjay Sharma, Olathe, KS (US); Janghyuk Pyon, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 336 days.

(21) Appl. No.: 12/345,816

(22) Filed: Dec. 30, 2008

(51) Int. Cl.
 *G06F 15/16* (2006.01)
(52) U.S. Cl. ........ 709/231; 709/203; 709/220; 709/221; 709/222; 709/227; 709/228
(58) Field of Classification Search .................. 709/231, 709/203, 220, 221, 222, 227, 228
See application file for complete search history.

(56) References Cited

U.S. PATENT DOCUMENTS

| | | | |
|---|---|---|---|
| 6,560,604 B1* | 5/2003 | Fascenda | 1/1 |
| 2003/0236906 A1* | 12/2003 | Klemets et al. | 709/231 |
| 2005/0235196 A1* | 10/2005 | Iwanaga et al. | 715/500 |
| 2007/0220419 A1* | 9/2007 | Stibel et al. | 715/511 |
| 2007/0266122 A1* | 11/2007 | Einarsson et al. | 709/220 |
| 2008/0242280 A1* | 10/2008 | Shapiro et al. | 455/414.3 |

* cited by examiner

*Primary Examiner* — Lan-Dai T Truong

(57) ABSTRACT

A method, system, and medium are provided for initiating and controlling a media stream with a single message sent from the mobile device to the content provider. The single message uses session description information from a session-description template. In response to receiving the single request, the content provider initiates transmission of the media content according to the instruction in the request. If the content provider does not have a version of the media that matches the selected session-description template, then the content provider may suggest a different version of the media content to the mobile device. The mobile device would then generate a new request based on the suggested version of the media content.

20 Claims, 6 Drawing Sheets

SINGLE MESSAGE MEDIA SESSION CONTROL

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of controlling a media session between a content provider and a mobile device are provided. The method includes receiving a request to send a specific version of the media content to the mobile device. The request includes audio-setup instructions, video-setup instructions, play instructions, and an identifier for a session-description ("SD") file template that describes attributes of the specific version of the media content. Determining whether the specific version of the media content is available for transmission to the mobile device, wherein the specific version of the media content has attributes that match the attributes in the SD template. If the specific version of the media content is available, then communicating the specific version of the media content to the mobile device. If the specific version of the media content is not available, proposing a new version of the media content to the mobile device, wherein the new version is available for transmission, receiving a new request from the mobile device for the media content, wherein the new request includes new audio-setup instructions, new video-setup instructions, and new play instructions that are compatible with session description attributes that describe the new version of the media content, and communicating the new version of the media content to the mobile device.

In another illustrative embodiment, one or more computer-readable media having computer-executable instructions embodied thereon for performing a method of controlling a streaming media session are provided. The method includes receiving a request for a media content from a user. The method also includes selecting a session-description ("SD") file template from a plurality of SD templates, wherein the SD template describes session attributes of a specific version of the media content. The method also includes, without soliciting session attributes from a content provider, generating a request for the specific version of the media content that includes setup information based on attributes in the SD template and a play request based on attributes in the SD template. The method further includes communicating the request to the content provider and receiving the media content from the content provider through a media stream.

In a third illustrative embodiment, one or more computer-readable media having computer-executable instructions embodied thereon for performing a method of initiating a streaming media session between a mobile device and a content provider are provided. The method includes receiving a request from a user of the mobile device for a media content hosted by the content provider. The method also includes selecting a session description ("SD") file template to use to generate a request for a specific version of the media content, wherein the SD template describes attributes of a specific version the media content, and wherein the SD template is stored in a data store on the mobile device. The method also includes generating a request for the specific version of the media content that includes video-setup information based on attributes in the SD template, audio-setup information based on attributes in the SD template, a play request based on attributes in the SD template, and identification information for the SD template. The method further includes communicating the request to the content provider and receiving the media content through a media stream.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
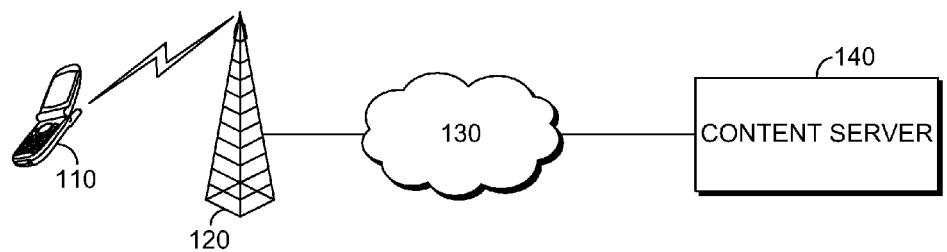
FIG. 1 is a drawing of an illustrative environment in which an embodiment of the present invention may operate.

Embodiments of the present invention generally relate to a method of establishing and controlling a communication session between a mobile device and a content provider to communicate media content (e.g., streaming video, multimedia teleconferences). Embodiments of the present invention establish the communication session and initiate transmission of the media content with a single request. The single request is generated by the mobile device without first receiving a session description from the content provider. Rather than requesting and receiving a session description, the mobile device selects a session description ("SD") template file from a plurality of SD templates. Session description information within the SD template is used to generate the control instructions within the single request. The name or version of the selected template may be communicated in the single request. The single request is sent to a content provider, such as a proxy server or content server. The content provider selects a version of the media content that matches the selected SD template, if possible, and begins transmission of the version of the media content. If a compatible version of the media content is not available, then the content provider may respond with session description information that corresponds to an available version of the media content. The mobile device then sends a new request based on the new session description information provided by the content provider.

When initiating a communication session, both the content provider and the mobile device may need to know various attributes of the media content. Throughout this disclosure, these attributes are referred to as the session description. The information in the session description template may be formatted according to the Session Description Protocol ("SDP"). For example, the SD template may be an SDP file. SDP is a format for session descriptions that may be used to describe attributes of media content. SDP does not incorporate transport protocols and may be utilized with different transport protocols as appropriate, including the Session Announcement Protocol ("SAP"), Session Initiation Protocol ("SIP"), Real-Time Streaming Protocol ("RTSP"), and others. In embodiments of the present invention, both the mobile device and the content provider may have data stores containing SD templates. The mobile device and the content provider may identify the SD templates according to an agreed upon identification convention that is mutually understood. Each SD template will have a unique identifier.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| CPU | Central Processing Unit |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile Communications |
| IP | Internet Protocol |
| IMS | IP Multimedia Subsystem |
| LAN | Local Access Network |
| LCD | Liquid Crystal Display |
| PDA | Personal Digital Assistant |
| PDSN | Packet Data Serving Node/Home Agent |
| RAM | Random Access Memory |
| RTSP | Real-Time Streaming Protocol |
| RTP | Real-Time Transport Protocol |
| ROM | Read Only Memory |
| SIP | Session Initiation Protocol |
| TDMA | Time Division Multiple Access |
| URL | Uniform Resource Locator |
| WAN | Wide Area Network |

Embodiments of the present invention may be embodied as, among other things: a method, system, or computer-program product.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information, such as computer storage media. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Embodiments of the present invention may be practiced in a communications network providing service to mobile devices. An illustrative operating environment 100 that contains a few of the components within such a communication network is shown in FIG. 1. The components shown in FIG. 1 are just some of the components that embodiments of the invention may interact with during operation. The components shown in FIG. 1 are described in brief, and with an emphasis on function for the sake of simplicity. The components within FIG. 1 are communicatively coupled to each other in a manner appropriate for carrying out their respective functions within the illustrative operating environment 100. Embodiments of the present invention are not limited by the communication protocols or formats used to facilitate communication between components; those mentioned are for the sake of enablement and not meant to be limiting.

Illustrative operating environment 100 includes mobile device 110, base station 120, network 130, and content server 140. Illustrative operating environment 100 is merely an example of one suitable environment and is not intended to suggest any limitation as to the scope of use or functionality of the present invention. Neither should illustrative operating environment 100 be interpreted as having any dependency or requirement related to any single component or combination of components illustrated therein. For example, the present invention may be practiced in an environment that does not include a wireless network. An operating environment including a wireless network is included for the sake of illustration and not limitation.

Mobile device 110 is a wireless terminal that is adapted to receive communications and media over the wireless networks included in illustrative operating environment 100. Specifically, mobile device 110 may access content over the Internet. Some lower-level details of mobile device 110 are not shown so as to not obscure embodiments of the present invention. For example, mobile device 110 may include a bus that directly or indirectly couples the following devices: memory, one or more processors, one or more presentation components such as a display or speaker, input/output ("I/O") ports, I/O components, and a power supply such as a battery. The display device is suitable for viewing media content such as movies, videos, video calls, or television shows. An LCD screen is one example of a display that might be used on the mobile device 110. Mobile device 110 may communicate via wireless protocols, such as code division multiple access ("CDMA"), global system for mobile communications ("GSM"), or time division multiple access ("TDMA"), as well as others, to communicate with base station 120.

Mobile device 110 may take on any of a variety of forms. By way of example, mobile device 110 may be a mobile telephone, smart phone, pager, computing device, personal digital assistant ("PDA") or any combination of these or other devices. Mobile device 110 has the ability to present one or more forms of media content. Examples of media content that could be displayed include, TV shows, movies, videos, MP3 files, and radio programs. This list is not exhaustive. The media may be presented as it is received from the wireless network or from memory within mobile device 110. Mobile device 110 may also be capable of receiving one or more forms of communication. Examples of communications that may be received include phone calls, video calls, text messages, multimedia messages, emails, calendar updates, and task reminders.

Base station 120 is a fixed station used for communicating with mobile device 110. Standard air interface protocols, such as code division multiple access ("CDMA"), global system for mobile communications ("GSM"), or time division multiple access ("TDMA"), as well as others, may be used by base station 120 to communicate with mobile device 110. Other network communication interface arrangements are also possible. A base station controller (not shown) is responsible for handling traffic and signaling with mobile device 110. Only one base station 120 is shown, and without its many components, for the sake of clarity. Mobile device 110 could be in simultaneous communication with multiple base stations.

Network 130 can be a wide area network ("WAN") and includes one or more mobile networks, one or more packet based networks, including the Internet, and the public switched telephone network ("PSTN"). The various components within network 130 may be owned and/or operated by multiple entities, commercial or otherwise. Network 130 is configured to transmit a variety of communication formats including phone calls, emails, text messaging, faxes, instant messaging, pages, voice mails, photographs, audio files, movies, TV shows, calendar reminders, task reminders and other files containing communicative content.

Content server 140 is a type of content provider. Content server 140 can be a combination of hardware and software. The network interface can be used to connect to a LAN, WAN (including the Internet), or other variety of communications network. The network interface to the WAN or LAN could be wired, wireless, or both. In one embodiment, software on content server 140 facilitates transmission of media content (e.g. movies, videos, MP3s, etc.) to mobile device 110. The content server 140 transmits the media content over the packet switched network 130. The content server 140 may also host web pages that are transmitted to a requesting user. Content server 140 may be affiliated with the entity providing the mobile communication service to mobile device 110. A content server is affiliated with an entity if it is owned or operated by the entity, or by a third party that has an agreement with the entity. The content server 140 may work in conjunction with other components, such as a proxy server (as shown in FIG. 2), to deliver content to a mobile device 110.

Figure 2:
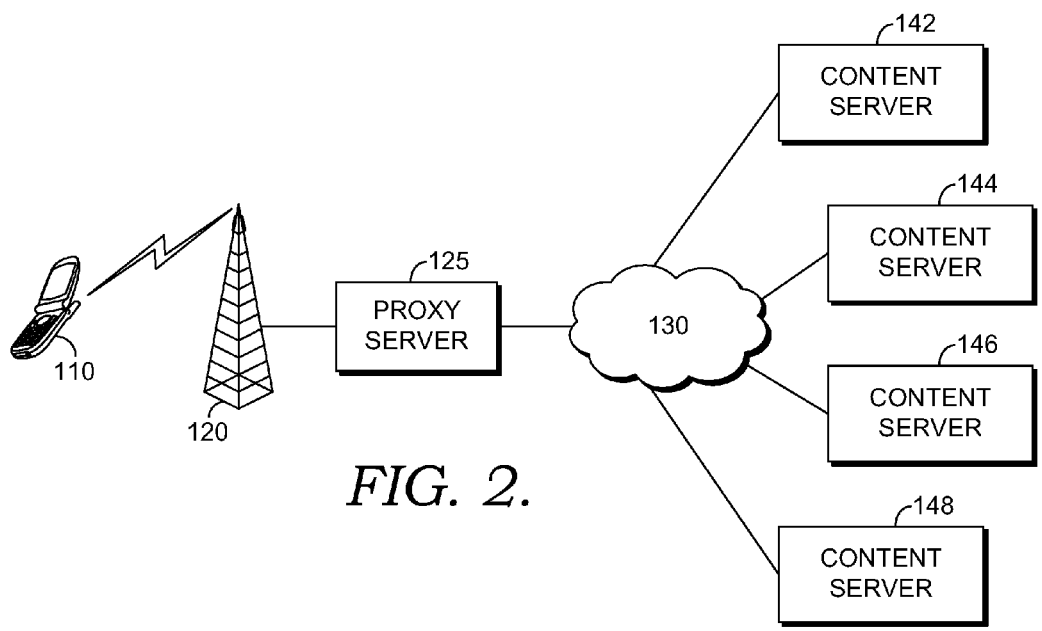
FIG. 2 is a drawing of an illustrative environment in which an embodiment of the present invention may operate.

Turning now to FIG. 2, an additional illustrative operating environment 200 is shown. Illustrative operating environment 200 shows some of the components that embodiments of the invention may interact with during operation. In FIG. 2, the mobile device 110 access as the media content through a proxy server 125 that caches media content. The components shown in FIG. 2 are described in brief and with an emphasis on function for the sake of simplicity. The components within FIG. 2 are communicatively coupled to each other in a manner appropriate for carrying out their respective functions within the illustrative operating environment 200. Embodiments of the present invention are not limited by the communication protocols or formats used to facilitate communication between components; those mentioned are for the sake of enablement and not meant to be limiting.

Illustrative operating environment 200 includes mobile device 110, base station 120, proxy server 125, network 130, and content servers 142, 144, 146, and 148. Illustrative operating environment 200 is merely an example of one suitable environment and is not intended to suggest any limitation as to the scope of use or functionality of the present invention. Neither should illustrative operating environment 200 be interpreted as having any dependency or requirement related to any single component or combination of components illustrated therein. For example, the present invention may be practiced in an environment that does not include a wireless network. An operating environment including a wireless network is included for the sake of illustration and not limitation.

Mobile device 110, base station 120, and network 130 have been described previously with reference to FIG. 1. Content server 142, content server 144, content server 146, and content server 148 are essentially similar to content server 140 described with reference to FIG. 1. The primary difference between content servers 142, 144, 146, and 148 and content server 140 is that content servers 142, 144, 146, and 148 send media content to mobile device 110 through proxy server 125.

Proxy server 125 is a combination of hardware and software. The hardware aspect is a computing device that may include a CPU, short-term memory, long-term memory, and one or more network interfaces. The network interface is used to connect to a LAN, WAN (including the Internet), or other variety of communications network. The network interface to the WAN or LAN could be wired, wireless, or both. In one embodiment, software on proxy server 125 receives requests from mobile devices connected to the radio access network.

The proxy server 125 may cache media content received from content providers 142, 144, 146, and 148. The cached media content may be transmitted to one or more requesting mobile devices. Upon receiving a request for media content, a communication session may be set up between a mobile device and the proxy server 125.

Figure 3:
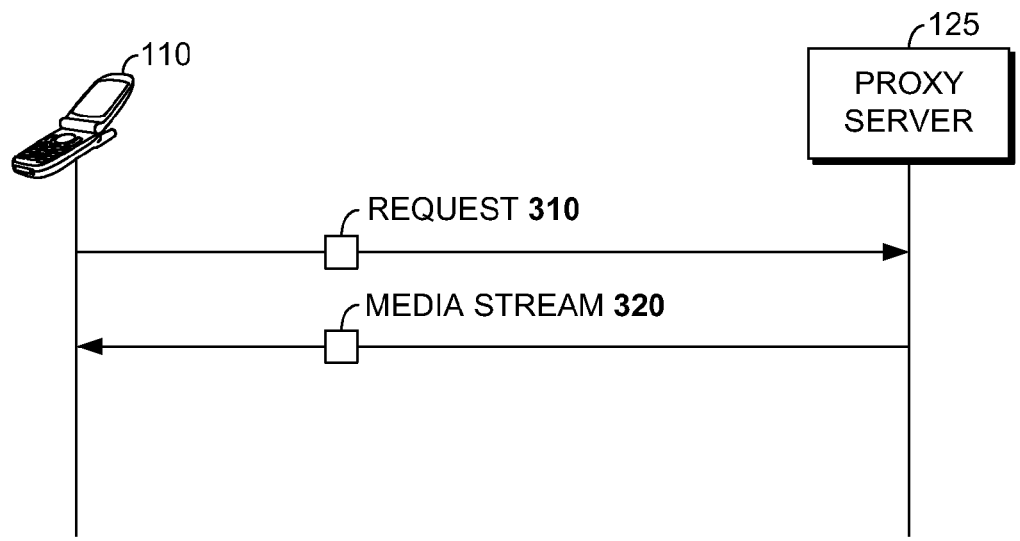
FIG. 3 is a drawing illustrating communications occurring between a mobile device and a proxy server, according to an embodiment of the present invention.

Turning now to FIG. 3, communications occurring between mobile device 310 and proxy server 325 during setup of a communication session are shown, in accordance with an embodiment of the present invention. The mobile device 310 and proxy server 325 may be similar to mobile device 110 and proxy server 125 described with reference to FIG. 2. The communications occurring in FIG. 3 illustrate the communications that occur when the request from mobile device 310 references a session-description ("SD") template matching a version of media content that is available on the proxy server 325. An SD template describes attributes of a version of a media content. Examples of attributes included in the SD template include the type of media (e.g., video, audio), the transport protocol, the format of the media (e.g., h.261video, mpeg video), address and port details, timing information, encryption information, session name, media title, and bandwidth information. This list is not meant to be exhaustive.

Initially, a request 310 is sent from mobile device 310 to proxy server 325. The request includes setup instructions and a play command. The setup instructions may include video-setup instructions and audio-setup instructions. The audio-setup instructions, the video-setup instructions, and the play command are all based on session description information from a session description ("SD") template selected by mobile device 310 prior to generating request 310. In some embodiments, the name of an SD template may be included in request 310. The SD template describes attributes of the requested media that are needed to setup a streaming media session.

Upon receiving request 310, proxy server 325 determines if a compatible version of the requested media content is available. A compatible version of the requested media content has attributes that match the attributes in the SD template. In the situation illustrated in FIG. 3, a compatible version of the media content is available. The compatible version of the media content is accessed and a streaming media session 320 is initiated by the proxy server 325. The media stream 320 is received by mobile device 310 and then may be displayed to the user. A steaming media session is the playing of one or more media streams in a continuous way while those streams are being transmitted to the client over a data network.

Figure 4:
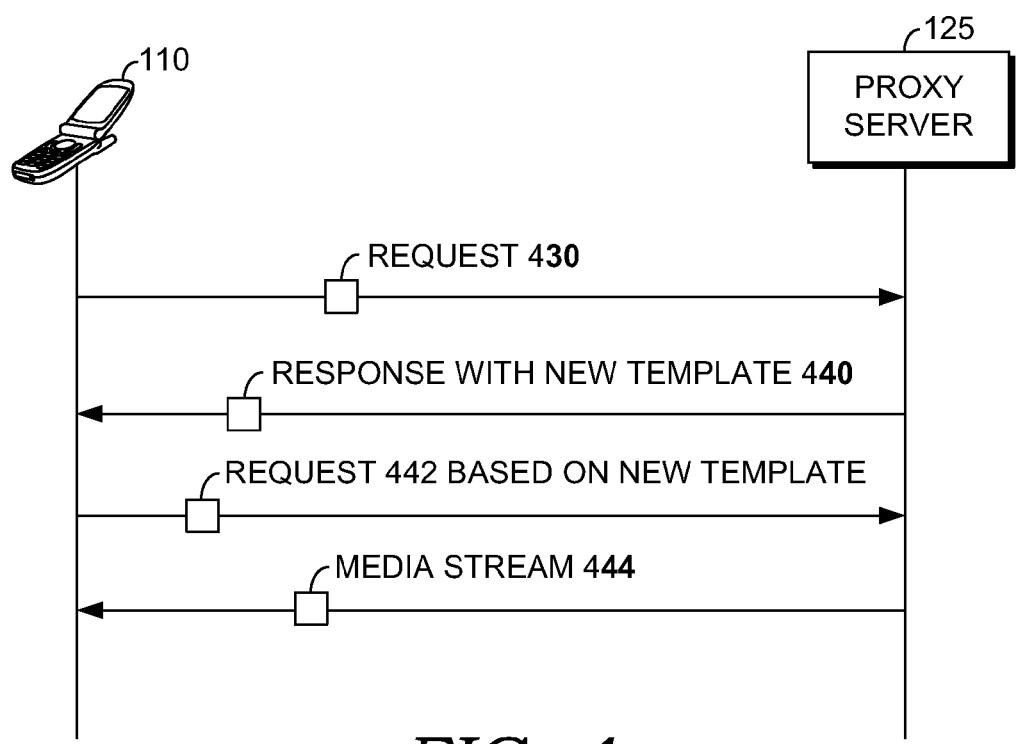
FIG. 4 is a drawing illustrating communications occurring between a mobile device and a proxy server, according to an embodiment of the present invention.

FIG. 4 illustrates an embodiment where a version of the media content that is compatible with the SD template selected by mobile device 410 is not found by proxy server 425. The mobile device 410 and proxy server 425 may be similar to mobile device 110 and proxy server 125 described with reference to FIG. 2. Initially, mobile device 410 selects an SD template to use as the basis of generating request 430. Request 430 is then sent from mobile device 410 to proxy server 425. Request 430 includes setup instructions and a play command. The setup instructions may include both audio-setup instructions and video-setup instructions. In addition, the name of the selected SD template may be included in request 430. As indicated previously, the proxy server 425 determines that it does not have a compatible version of the requested media content. A compatible version of the media content includes attributes that match the attributes in the SD template. In response to determining that a compatible version of the media content is not available, response 440 is sent back to mobile device 410. Response 440 proposes a different version of the media content by including new SD template information.

In one embodiment, response 440 may include the name of an SD template for which proxy server 425 has an available version of the media content. In another embodiment, response 440 includes an actual SD template for an available version of the media content. It may be desirable to send the actual SD template when a new version of the requested media content is available and the mobile device 410 is not likely to have a copy of the new SD template.

In response to receiving response 440, mobile device 410 generates a new request 442 based on the SD template information provided in response 440. Request 442 includes setup instructions and play instructions, all of which are based on the new SD template information provided in response 442. Upon receiving request 442, proxy server 425 initiates media stream 444, which is received by mobile device 410. In one embodiment, media stream 444 conforms with RTSP protocols.

Figure 5:
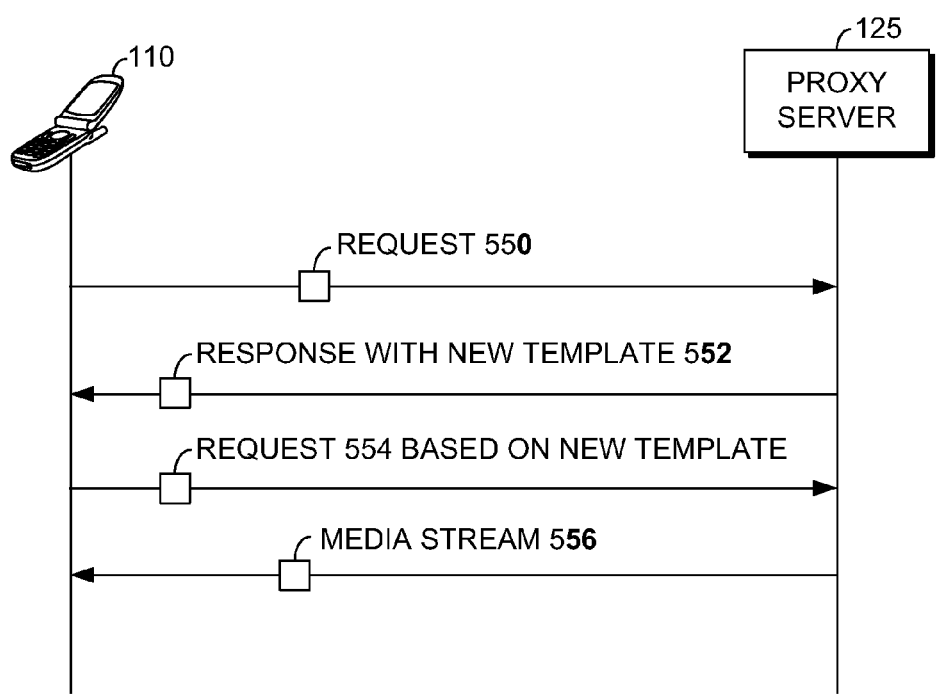
FIG. 5 is a drawing illustrating communications occurring between a mobile device and a proxy server, according to an embodiment of the present invention.

FIG. 5 illustrates responding to a request based on an SD template for which a compatible version of the media content is not available by providing a session-description file. The mobile device 510 and proxy server 525 may be similar to mobile device 110 and proxy server 125 described with reference to FIG. 2. Initially, mobile device 510 sends request 550 to proxy server 525. Request 550 may include audio-setup instructions, video-setup instructions, and play instructions. The video-setup instructions, audio-setup instructions, and play instructions are all based on an SD file template selected by mobile device 510. Request 550 may also include the name of the SD template on which the request is based. It should be noted that mobile device 510 selected the SD template without input from proxy server 525. The SD template may have been selected based on a default setting, frequency of use, or frequency of use with the particular proxy server 525. A compatible version of the requested media content is not found by proxy server 525. A compatible version of the media content contains attributes that match the attributes in the SD template selected by mobile device 510. In response to not finding a compatible version of the requested media content, response 552 is sent from proxy server 525 to mobile device 510. Response 552 includes a session-description file. Like the SD template, the session-description file describes attributes of a version of the media content needed to set up a streaming media session. Upon receiving response 552, mobile device 510 generates a new request 554 based on the session-description file sent in response 552. The audio-setup instructions, video-setup instructions, and play instructions in request 554 are based on the session-description file. In response to receiving request 554, proxy server 525 sends media stream 556. Media stream 556 includes a version of the media content that is compatible with information included in the session-description file included in response 552.

Figure 6:
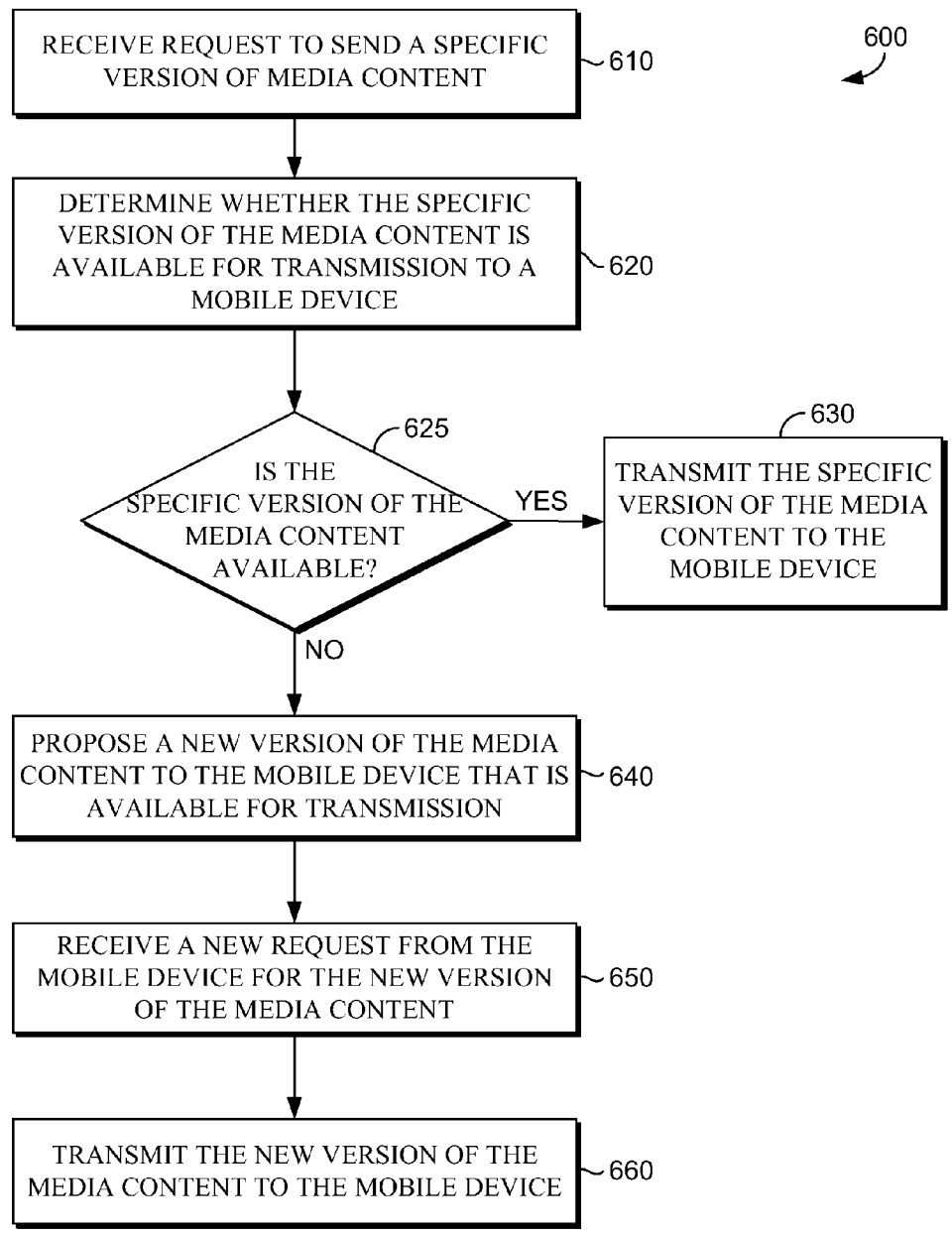
FIG. 6 is a flow diagram in which a method of controlling a media session between a content provider and a mobile device is described, according to an embodiment of the present invention.

Turning now to FIG. 6, a method of controlling a streaming media session between a content provider and a mobile device is shown, in accordance with an embodiment of the present invention. In one embodiment, the media session is a streaming RTSP media session. The mobile device may be similar to mobile device 110 described previously with reference to FIG. 1. The content provider may be a media server, such as content server 140 or proxy server 125, that the mobile device connects to over a data network.

At step 610, a request is received from the mobile device to send a specific version of the media content to the mobile device. The request includes audio-setup instructions, video-setup instructions, play instructions, and a identification information for a session-description ("SD") file template that describes attributes of the specific version of the media content. In one embodiment, the audio-setup instructions, video-setup instructions and play instructions conform to RTSP protocols.

At step 620, the versions of the media content on the content provider are evaluated to determine whether the specific version of the media content is available for transmission to the mobile device. The specific version of the media content is accurately described by attributes in the SD template. In an embodiment of the present invention, the content provider may have a data store of media content that includes multiple versions of the same media content. The different versions of media content may be optimized for different mobile devices, connections, network conditions, media presentation programs, and other factors. Each version of the media content may be associated with an SD template that describes various attributes of the particular version of the media content. Upon receiving a request specifying an SD template, the content provider may search its database for the version of the media content that matches the SD template provided. The match may occur based on attributes of the setup and play instruction or based on the name of the SD template included in the request.

Step 625 asks if the specific version of the media content is available. At step 630, if the specific version of the media content is available, the specific version of the media content is transmitted to the mobile device. In one embodiment, the specific version is transmitted by initiating a media stream that conforms with RTSP protocols.

At step 640, if the specific version of the media content is not available, then a new version of the media content is proposed to the mobile device. In addition, a new request for the new version of the media content is received from the mobile device for the requested media content. The new request includes new audio-setup instructions, new video-setup instructions, and new play instructions that are based on the new version of the media content. Further, the new version of media content is transmitted to the media device. Again, the transmission may be in a form of a media stream conforming with RTSP protocols.

A new version of the media content may be proposed to the requesting mobile device in a number of different ways. In one embodiment, a new version is proposed to the mobile device by including the name of a different SD template, which is compatible with the new version of the media content, in a response sent to the mobile device. The name of the SD template may take the form of any description that is recognizable to the mobile device. Simply including the name, or a unique identifier, associated with the different SD template works well when the mobile device is likely to have a copy of the different SD template. If the mobile device is not likely to have the different SD template, then other methods of proposing a new version of the media content may be utilized.

In one embodiment, the new version of the media content is proposed by generating a new SD template that describes the new version of the media content. Upon generating the new SD template, a response is sent to the client that includes a copy of the new SD template. The mobile device may then use the new SD template to generate the new instructions that conform to the new SD template. Once an SD template that matches a proposed version of the media content is generated, it can be stored for later use. In one embodiment, an existing SD template that matches a proposed version of the media content is transmitted in a response to the mobile device.

In one embodiment, steps 610, 620, 625, 630, and 640 are performed without first sending a session description to the mobile device or receiving a request for a session description from the mobile device. For example, the method of steps 610, 620, 625, 630, and 640 may be performed without first receiving a DESCRIBE request that conforms to RTSP protocols. The description of attributes in the SD template may conform to the session description protocol ("SDP").

Figure 7:
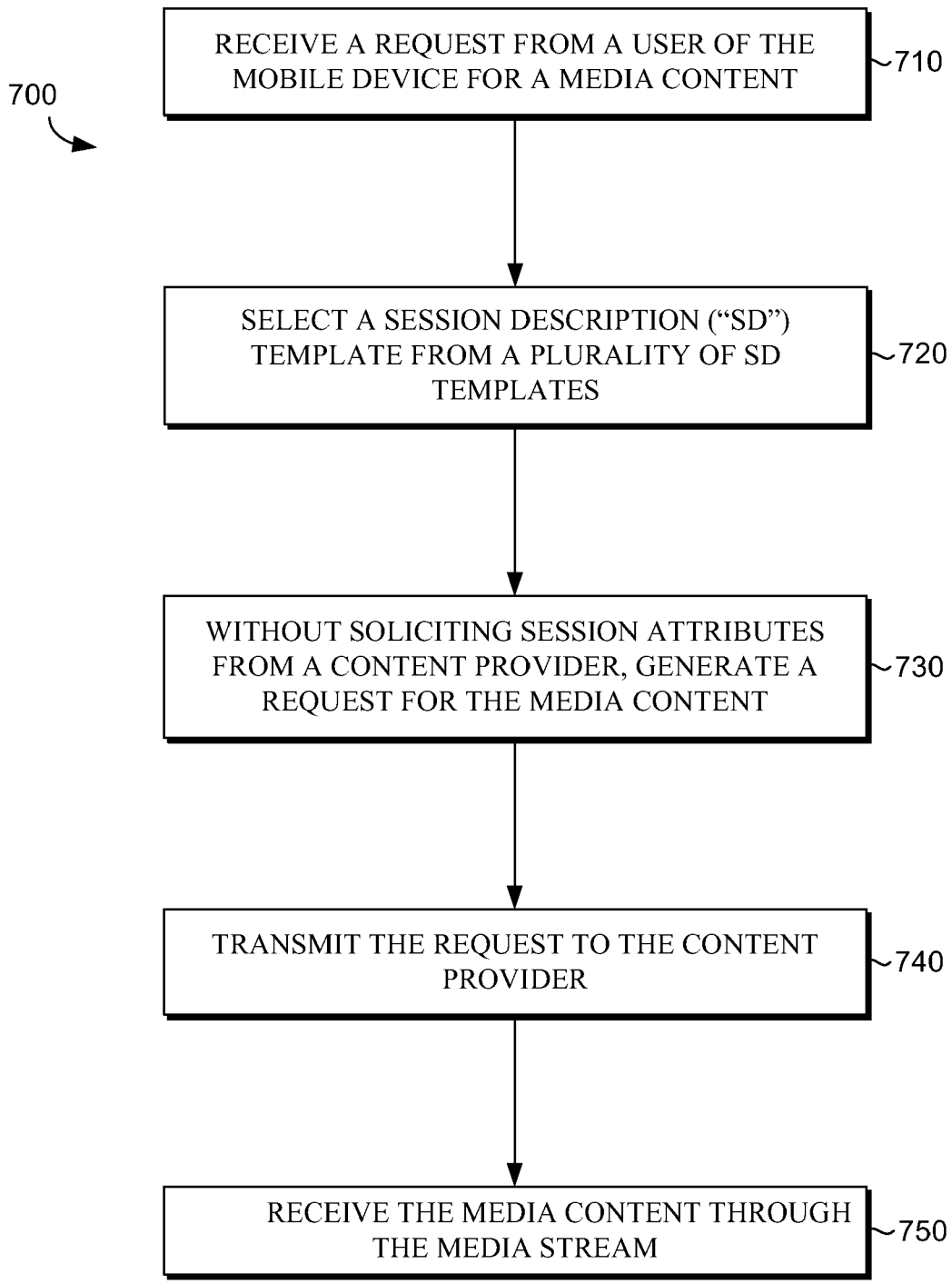
FIG. 7 is a flow diagram in which a method of controlling a streaming media session is described, according to an embodiment of the present invention.

Turning now to FIG. 7, a method of controlling a streaming media is shown, in accordance with an embodiment of the present invention. At step 710, a request for media content is received from a user. In one embodiment, a request for media content takes the form of selecting a link in a browser window. In another embodiment, a URL is submitted to the mobile device directly. At step 720, a SD template is selected from a plurality of SD templates. As described previously, the SD template describes attributes of a version of the media content that are utilized to set up a streaming media session. Examples of attributes included in the SD template include the type of media (e.g., video, audio), the transport protocol, the format of the media (e.g., h.261video, mpeg video), address and port details, timing information, encryption information, session name, media title, and bandwidth information. This list is not meant to be exhaustive.

The SD template may be selected based on different criteria. In one embodiment, the SD template is selected based on a default preference. The default preference may be set by the user or by the mobile device's service provider. In another embodiment, the SD template is selected based on frequency of use. In other words, the SD template is selected to describe a version of the media most frequently received by the requesting mobile device. In another embodiment, the SD template is selected based on the frequency of use with a specific content provider associated with the media content request by the user. For example, the version of media most frequently received from the content provider to whom the present request is directed may be used to select the SD file template. Taking the content provider into account when selecting the SD template may improve the probability of the selected SD template matching an available version of the media content.

At step 730, without soliciting session description information from the content provider, a request for a specific version of the media content is generated based on the SD template. The request includes setup information based on attributes in the SD template and a play request based on attributes in the SD template. Setup information may include audio-setup information and video-setup information.

At step 740, the request is transmitted to the content provider. At step 750, the media content is received from the content provider. In one embodiment, the media content is received as a streaming media session conforming to RTSP protocols.

Figure 8:
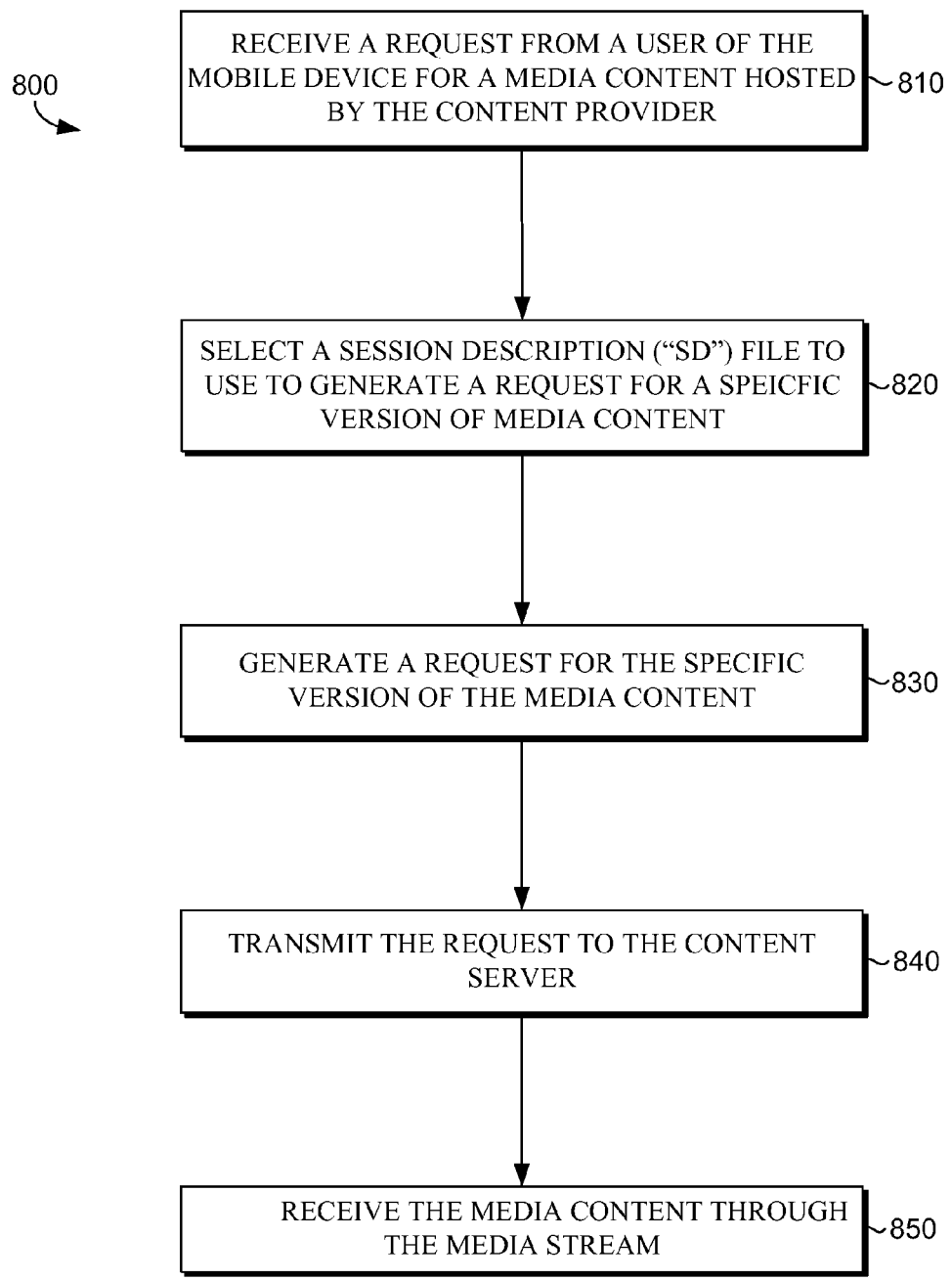
FIG. 8 is a flow diagram in which a method of initiating a streaming media session between a mobile device and a content provider is described, according to an embodiment of the present invention.

Turning now to FIG. 8, a method of starting a streaming media session between a mobile device and a content provider is shown in accordance with embodiments of the present invention. The mobile device and content provider may conform to packet-switched streaming service protocols. At step 810, a request from a user of a mobile device is received for a media content hosted by the content provider. For example, the user of the mobile device may submit a URL to access the media content. At step 820, an SD file template is selected to use to generate a request for a specific version of the media content. As described previously, the SD template describes attributes of the specific version of the media content. The SD template may be stored in a data store located on the mobile device. As described previously, the SD template may be selected based on a default value, frequency of use, and frequency of use with the particular content server.

At step 830, a request is generated. The request includes video-setup information based on attributes in the SD template, audio-setup information based on attributes in the SD template, a play request based on attributes in the SD template, and identification information for the SD template selected. At step 840, the request is transmitted to the content server. At step 850, the media content is received through a streaming media session.

Many different arrangements of the various components depicted, as well as components not shown, are possible without departing from the spirit and scope of the present invention. Embodiments of the present invention have been described with the intent to be illustrative rather than restrictive. Certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of controlling a media session between a content provider and a mobile device, the method comprising:

receiving a request to send a specific version of a media content to the mobile device, wherein the request includes audio-setup instructions, video-setup instructions, play instructions, and an identifier for a session-description ("SD") file template that describes attributes of the specific version of the media content;

determining whether the specific version of the media content is available for transmission to the mobile device, wherein the specific version of the media content has attributes that match the attributes in the session-description ("SD") template;

if the specific version of the media content is available, then communicating the specific version of the media content to the mobile device; and if the specific version of the media content is not available, then (1) proposing a new version of the media content to the mobile device, wherein the new version is available for transmission, (2) receiving a new request from the mobile device for the media content, wherein the new request includes new audio-setup instructions, new video-setup instructions, and new play instructions that are compatible with session description attributes that describe the new version of the media content, and (3) communicating the new version of the media content to the mobile device.

2. The non-transitory computer-readable media of claim 1, wherein proposing the new version of the media content includes communicating a response to the mobile device that includes identification information for a different session-description ("SD") template that is compatible with the new version of the media content.

3. The non-transitory computer-readable media of claim 1, wherein proposing the new version of the media content includes:

generating a new session-description ("SD") template that describes the new version of the media content; and communicating a response to the mobile device that includes the new session-description ("SD") template.

4. The non-transitory computer-readable media of claim 1, wherein proposing the new version of the media content includes communicating a response to the mobile device that includes an session-description ("SD") template that describes the new version of the media content.

5. The non-transitory computer-readable media of claim 1, wherein the method does not include sending a session description to the mobile device and does not include receiving a request for the session description from the mobile device.

6. The non-transitory computer-readable media of claim 1, wherein the method is performed by one or more of a streaming server and a proxy server.

7. The non-transitory computer-readable media of claim 6, wherein the session-description ("SD") template is an SDP file.

8. One or more non-transitory computer-readable media having computer-executable instructions embodied thereon for performing a method of controlling a streaming media session, the method comprising:

receiving a request for a media content from a user;

selecting a session-description ("SD") file template from a plurality of session-description ("SD") templates, wherein the session-description ("SD") template describes session attributes of a specific version of the media content;

without soliciting session description information from a content provider, generating a request for the specific version of the media content that is based on the session-description ("SD") template, wherein the request includes audio-setup instructions, video-setup instructions, and a play request based on attributes in the session-description ("SD") template and an identifier for the session-description ("SD") file template and wherein session description information describes session attributes of the specific version of the media content;

communicating the request to the content provider;

receiving the specific version of the media content from the content provider through a media stream in response to the request if the specific versions of the media contents is available; and if the specific version of the media content is not available, then (1) receiving a proposal for a new version of the media content, wherein the new version is available for transmission, (2) sending a new request for the media content, wherein the new request includes new audio-setup instructions, new video-setup instructions, and new play instructions that are compatible with session description attributes that describe the new version of the media content, and (3) receiving the new version of the media content.

9. The non-transitory computer-readable media of claim 8, wherein the session-description ("SD") template is selected based on a default preference.

10. The non-transitory computer-readable media of claim 8, wherein the session-description ("SD") template is selected based on frequency of use.

11. The non-transitory computer-readable media of claim 8, wherein the request includes a unique identifier for the session-description ("SD") template.

12. The non-transitory computer-readable media of claim 8, wherein the setup information includes one or more of audio-setup information and video-setup information.

13. The non-transitory computer-readable media of claim 8, wherein the method further includes:

receiving a response from the content provider that includes a name of a different session-description ("SD") template;

generating a new request for the media content that includes new setup information based on attributes in the different session-description ("SD") template and a new play request based on attributes in the different session-description ("SD") template; and communicating the new request to the content provider.

14. The non-transitory computer-readable media of claim 8, wherein the method further includes:

receiving a response from the content provider that includes a session description file that includes attributes of the media content;

generating a new request for the media content that includes new setup information based on attributes in the session-description file and a new play request based on attributes in the session-description file; and communicating the new request to the content provider.

15. The non-transitory computer-readable media of claim 8, wherein the session-description ("SD") template conforms to the Session Description Protocol and the media stream conforms to the Real Time Streaming Protocol.

16. One or more non-transitory computer-readable media having computer-executable instructions embodied thereon for performing a method of starting a streaming media session between a mobile device and a content provider, the method comprising:

receiving a request from a user of the mobile device for a media content hosted by the content provider;

selecting a session description ("SD") file template to use to generate a request for a specific version of the media content, wherein the session-description ("SD") template describes attributes of the specific version of the media content, and wherein the session-description ("SD") template is stored in a data store on the mobile device;

generating a request for the specific version of the media content, wherein the request includes video-setup information based on attributes in the session-description ("SD") template, audio-setup information based on attributes in the session-description ("SD") template, a play request based on attributes in the session-description ("SD") template, and identification information for the session-description ("SD") template;

communicating the request to the content provider;

receiving the specific version of the media content from the content provider through the media stream in response to the request when the specific version of the media contents is available; and when the specific version of the media content is not available, then
  (1) receiving a proposal for a new version of the media content, wherein the new version is available for transmission,
  (2) sending a new request for the media content, wherein the new request includes new audio-setup instructions, new video-setup instructions, and new play instructions that are compatible with session description attributes that describe the new version of the media content, and
  (3) receiving the new version of the media content.

17. The non-transitory computer-readable media of claim 16, wherein the method further includes:
  receiving a response from the content provider that includes a name of a different session-description ("SD") template;
  generating a new request for the media content that includes new video-setup information based on attributes in the different session-description ("SD") template, new audio-setup information based on attributes in the different session-description ("SD") template, and a new play request based on attributes in the different session-description ("SD") template; and
  communicating the new request to the content provider.

18. The non-transitory computer-readable media of claim 16, wherein the method further includes:
  receiving a response from the content provider that includes a session description file that describes attributes of a new version of the media content;
  generating a new request for the media content that includes new video-setup information based on attributes in the session-description file, new audio-setup information based on attributes in the session-description file, and a new play request based on attributes in the session-description file; and
  communicating the new request to the content provider.

19. The non-transitory computer-readable media of claim 16, wherein the session-description ("SD") template is selected based on a default preference.

20. The non-transitory computer-readable media of claim 19, wherein the session-description ("SD") template is selected based on a media format that is most frequently received.

* * * * *